United States Patent
Griffin et al.

(10) Patent No.: US 12,314,711 B2
(45) Date of Patent: May 27, 2025

(54) DERIVING A CUSTOM VERSION OF A SOFTWARE PACKAGE FROM SUPER POSITIONED QUBITS

(71) Applicant: Red Hat, Inc., Raleigh, NC (US)

(72) Inventors: Leigh Griffin, Waterford (IE);
Pierre-Yves Chibon, Puteaux (FR)

(73) Assignee: Red Hat, Inc., Raleigh, NC (US)

( * ) Notice: Subject to any disclaimer, the term of this patent is extended or adjusted under 35 U.S.C. 154(b) by 220 days.

(21) Appl. No.: 18/309,060

(22) Filed: Apr. 28, 2023

(65) Prior Publication Data

US 2024/0362018 A1   Oct. 31, 2024

(51) Int. Cl.
| | |
|---|---|
| G06F 9/44 | (2018.01) |
| G06F 8/61 | (2018.01) |
| G06F 8/71 | (2018.01) |
| G06N 10/40 | (2022.01) |

(52) U.S. Cl.
CPC .......... *G06F 8/71* (2013.01); *G06F 8/61* (2013.01); *G06N 10/40* (2022.01)

(58) Field of Classification Search
CPC .............. G06F 8/71; G06F 8/61; G06N 10/40
See application file for complete search history.

(56) References Cited

U.S. PATENT DOCUMENTS

| | | | |
|---|---|---|---|
| 8,612,966 B2 | 12/2013 | Huff et al. | |
| 8,806,471 B2 | 8/2014 | Vidal et al. | |
| 9,009,696 B2 | 4/2015 | Vidal et al. | |
| 9,417,865 B2 | 8/2016 | Vidal et al. | |
| 2005/0022175 A1* | 1/2005 | Sliger | G06F 8/658 717/169 |
| 2005/0059020 A1* | 3/2005 | Vitaliano | G06N 10/40 702/19 |
| 2013/0198720 A1* | 8/2013 | Maurice | G06F 8/64 717/122 |

(Continued)

FOREIGN PATENT DOCUMENTS

CN   102105874 B   2/2014

OTHER PUBLICATIONS

Kowalewski, Markus, et al., "Sustainable Packaging of Quantum Chemistry Software with the Nix Package Manager," Int. J. Quantum Chem., 122, e26872, http://arxiv.org/abs/2110.05163v2, Dec. 16, 2021, 15 pages.

(Continued)

*Primary Examiner* — Hang Pan
(74) *Attorney, Agent, or Firm* — Dority & Manning, P.A.

(57) ABSTRACT

A quantum computing system (QCS) receives from a computing device a request for a custom software version of a software package that includes a subset of features from a set of features implemented by a version of the software package, the request identifying the software package and the subset of features. The QCS places each qubit of a plurality of qubits in which the version of the software package is stored in a state of superposition. The QCS accesses a data structure to determine a subset of the plurality of qubits. The QCS biases the qubits in the subset. The QCS measures values of each qubit in superposition to extract the subset of features from the plurality of qubits. The QCS generates a custom software package based on the values measured in the plurality of qubits.

20 Claims, 4 Drawing Sheets

(56) References Cited

U.S. PATENT DOCUMENTS

Figure 1:
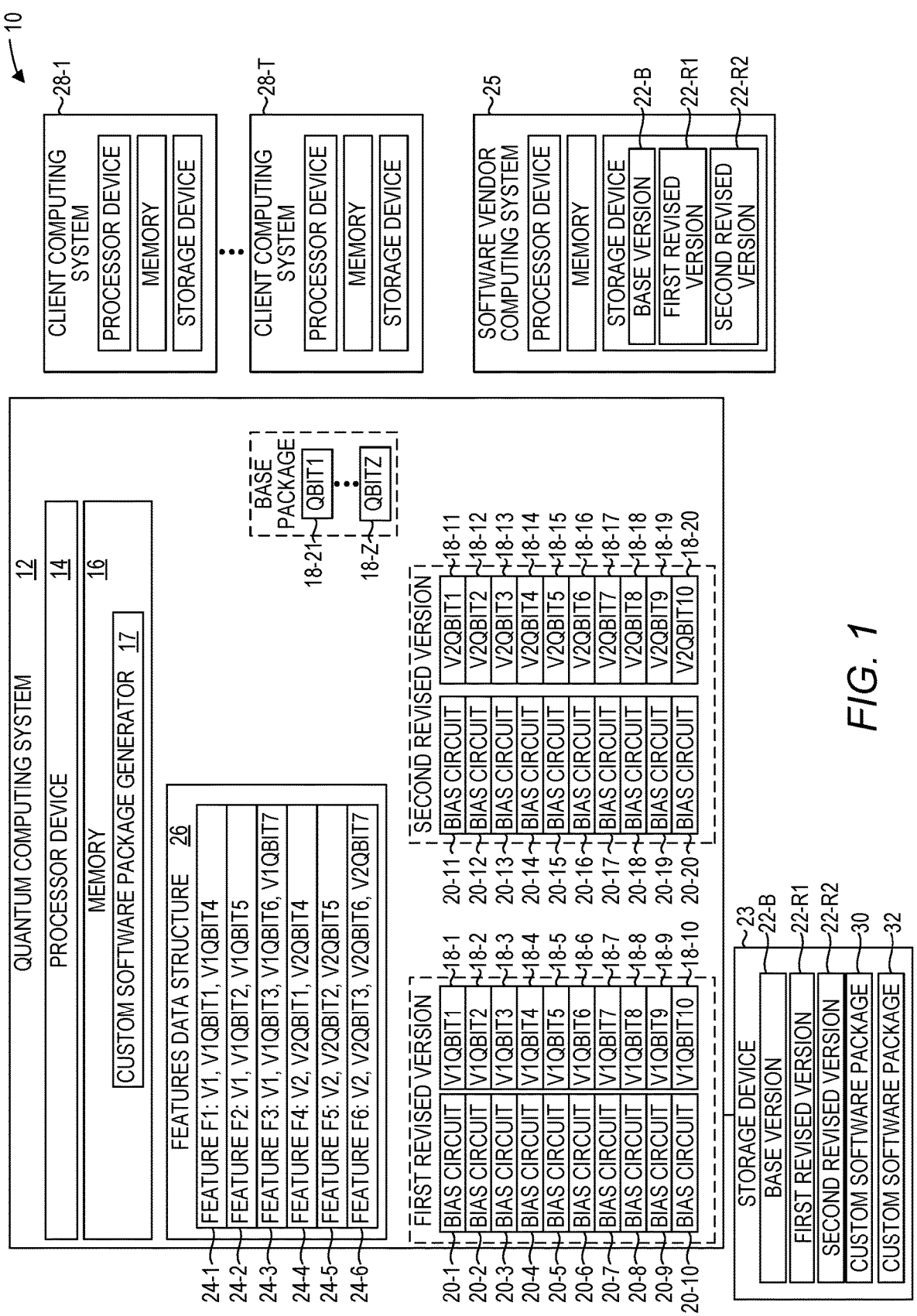

| | | | | |
|---|---|---|---|---|
| 2014/0118023 A1* | 5/2014 | Eastin | ................ | H03K 19/195 326/7 |
| 2020/0193272 A1* | 6/2020 | Chudak | ................ | G06N 10/60 |
| 2022/0067567 A1* | 3/2022 | O'Brien | ................ | G06N 10/40 |

OTHER PUBLICATIONS

Weder, Benjamin, et al., "Hybrid Quantum Applications Need Two Orchestrations in Superposition: A Software Architecture Perspective," Institute of Architecture of Application Systems, Proceedings of the 18th IEEE International Conference on Web Services (ICWS 2021), doi: 10.1109/ICWS53863.2021.00015, 2021, 13 pages.

\* cited by examiner

DERIVING A CUSTOM VERSION OF A SOFTWARE PACKAGE FROM SUPER POSITIONED QUBITS

BACKGROUND

Quantum computing involves the use of quantum bits, referred to herein as "qubits," which have characteristics that differ from those of classical (e.g., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit may not be described independently of the state of the other qubit.

SUMMARY

In one example a method is provided. The method includes receiving, by a quantum computing system (QCS) from a first computing device, a first request for a custom software version of a software package that comprises a first subset of features from a set of features implemented by a first version of the software package, the first request identifying the software package and the first subset of features. The method further includes placing, by the QCS, each qubit of a first plurality of qubits in which the first version of the software package is stored in a state of superposition. The method further includes accessing, by the QCS, a features data structure to determine a first custom set of qubits that comprises a first subset of the first plurality of qubits. The method further includes biasing, by the QCS, those qubits in the first custom set of qubits. The method further includes measuring, by the QCS, values of each qubit in superposition to extract the first subset of features from the first plurality of qubits. The method further includes measuring, by the QCS, values of each qubit in a second plurality of qubits in which a base version of the software package is stored. The method further includes generating, by the QCS, a first custom software package based on the values measured in the first plurality of qubits and the second plurality of qubits.

In another example a quantum computing system is provided. The quantum computing system includes a memory and a processor device coupled to the memory to receive, from a first computing device, a first request for a custom software version of a software package that comprises a first subset of features from a set of features implemented by a first version of the software package, the first request identifying the software package and the first subset of features. The processor device is further to place each qubit of a first plurality of qubits in which the first version of the software package is stored in a state of superposition. The processor device is further to access a features data structure to determine a first custom set of qubits that comprises a first subset of the first plurality of qubits. The processor device is further to bias those qubits in the first custom set of qubits. The processor device is further to measure values of each qubit in superposition to extract the first subset of features from the first plurality of qubits. The processor device is further to measure values of each qubit in a second plurality of qubits in which a base version of the software package is stored. The processor device is further to generate a first custom software package based on the values measured in the first plurality of qubits and the second plurality of qubits.

In another example a non-transitory computer-readable storage medium is provided. The non-transitory computer-readable storage medium includes executable instructions to cause a processor device to receive, from a first computing device, a first request for a custom software version of a software package that comprises a first subset of features from a set of features implemented by a first version of the software package, the first request identifying the software package and the first subset of features. The instructions further cause the processor device to place each qubit of a first plurality of qubits in which the first version of the software package is stored in a state of superposition. The instructions further cause the processor device to access a features data structure to determine a first custom set of qubits that comprises a first subset of the first plurality of qubits. The instructions further cause the processor device to bias those qubits in the first custom set of qubits. The instructions further cause the processor device to measure values of each qubit in superposition to extract the first subset of features from the first plurality of qubits. The instructions further cause the processor device to measure values of each qubit in a second plurality of qubits in which a base version of the software package is stored. The instructions further cause the processor device to generate a first custom software package based on the values measured in the first plurality of qubits and the second plurality of qubits.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 1 is a block diagram of an environment in which deriving a custom version of a software package from super positioned qubits can be practiced according to some examples;

FIG. 2 is a flowchart of a method for deriving a custom version of a software package from super positioned qubits according to one example;

FIG. 3 is a simplified block diagram of the environment illustrated in FIG. 1 according to one embodiment; and FIG. 4 is a block diagram of a quantum computing system suitable for deriving a custom version of a software package from super positioned qubits according to one example.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Quantum computing is a rapidly evolving technology, and the number of qubits that can be implemented on a quantum computing system is increasing at a rapid pace. In addition, the length of time that a qubit can be maintained in a stable state is increasing.

A complex software package typically includes hundreds of different files that collectively implement some desired functionality. A customer purchases the right to use the software package, downloads the software package, and then installs the software package. The manufacturer of the software package typically releases new versions over time, each of which may implement new features. Typically, a customer must implement all of the new version or none of the new version, even though the customer may only want one or two features of the many new features that may be implemented in the new version. Often a customer may want only certain features implemented in one version and certain features implemented in a subsequent version, but must install both versions completely to obtain the desired new features, resulting in a software package that utilizes more disk space, and processor and memory resources than would otherwise be necessary.

The examples disclosed herein implement the generation of a custom version of a software package using super positioned qubits. A quantum computing system (QCS) maintains a feature data structure that maps features implemented by a revised version of a software package to qubits in which the revised version can be stored. A request is received that identifies a subset of features of the set of features implemented in the revised version of the software package. The revised version of the software package can be stored in a plurality of qubits, and the qubits can be put into superposition. The feature data structure can be accessed to determine which qubits contain the data associated with the identified subset of features. Those qubits can be biased, such as magnetically, via annealing, or otherwise, to influence the values returned when the qubits are read (e.g., measured).

In some implementations, all the combinatorial versions of the software package and all discrete feature sets can be put into superposition, and desired features from the feature sets can be extracted from the super positioned qubits.

The qubits that store the base version of the software can also be read, and combined with the qubit values that store the revised version of the software package to generate a custom software package that contains the base version and only those features in the revised version. The bias can comprise, by way of non-limiting example, a magnetic field or an electric field, depending on a type of qubit being used. A bias changes the energy levels of the qubit, which alters the probabilities of measuring the qubit in either a 0 or 1 state. By manipulating the bias, it is possible to control the probabilities of measuring the qubit in each state. The ability to bias qubits in superposition ensures that, when the superposition qubits collapse, we have ensured that some qubits fall into a particular state. Thus, their inclusion (or exclusion) from a results set can be predetermined, or provide a desired outcome.

FIG. 1 is a block diagram of an environment 10 in which deriving a custom version of a software package from super positioned qubits can be practiced according to some examples. The environment 10 includes a quantum computing system (QCS) 12 that includes a processor device 14 and a memory 16. A custom software package generator 17 executes in the memory 16. The QCS 12 implements a plurality of qubits 18-1-18-Z (generally, qubits 18). The number of qubits 18 may be hundreds or thousands of qubits 18. The QCS 12 operates in a quantum environment but can operate using classical computing principles or quantum computing principles. When using quantum computing principles, the QCS 12 performs computations that utilize quantum-mechanical phenomena, such as superposition and entanglement. The QCS 12 may operate under certain environmental conditions, such as at or near 0° Kelvin. When using classical computing principles, the QCS 12 utilizes binary digits that have a value of either 1 or 0.

The QCS 12 also includes biasing circuits 20-1-20-20 (generally, biasing circuits 20) associated with corresponding qubits 18. The biasing circuits 20 comprise hardware for applying one or more biases to a corresponding qubit 18. The biases can influence the states of the qubits 18. Examples of the biases can include a magnetic field bias or an electric charge bias that is configured to influence the state of a corresponding qubit 18. The biasing circuits 20 can be made of any suitable hardware components that may be programmatically controlled. For example, a biasing circuit 20 can include a loop of metal in proximity to a corresponding qubit 18 to generate a magnetic field on the qubit 18. The loop of metal may include a Josephson junction. The characteristics of the magnetic field can depend on the properties (e.g., magnitude, frequency, and phase) of the current supplied to the loop, where the current properties can be programmatically controlled. The current properties may be programmatically controlled by the processor 14 of the QCS 12 or by any other suitable hardware, such as a control system that is internal to the QCS 12. In this way, each of the biasing circuits 20 can be individually and programmatically controlled to apply a certain amount of bias on at least one corresponding qubit 18. Applying the bias to the quantum bit can influence the state of the quantum bit, for example by causing the qubit 18 to have a higher probability of being in a target basis state or landing in the target basis state subsequent to a readout (e.g., measuring) operation.

The QCS 12 receives a base version 22-B of a software package from a computing device 25 associated with a software vendor and stores the base version 22-B of the software package on a storage device 23. The software package may implement any desired functionality, and may comprise any number of data, executable, and other files. The software package may include an installation program which, when executed, installs the software package on a desired computing device.

The custom software package generator 17 determines that the base version 22-B can be stored in a plurality of qubits 18-21-18-Z. Subsequently, the QCS 12 receives from the computing device 25 a first revised version 22-R1 that introduces a first set of three additional features to the base version 22-B. The custom software package generator 17 determines, for each respective feature in the first set of three additional features, a mapping between the respective feature and a group of qubits in which the respective feature can be stored. The custom software package generator 17 stores the mappings as entries 24-1-24-3 in a features data structure 26. The entry 24-1 corresponds to a first feature F1 and will be stored in the qubits 18-1 and 18-4, the entry 24-2 corresponds to a second feature F2 and will be stored in the qubits 18-2 and 18-5, and the entry 24-3 corresponds to a third feature F3 and will be stored in the qubits 18-3, 18-6, and 18-7.

The custom software package generator 17 may determine what features are in the first revised version 22-R1 based on metadata associated with the first revised version 22-R1. For example, the metadata may identify the particular files contained in the first revised version 22-R1 that implement the additional three features F1, F2, and F3.

Subsequently, the QCS 12 receives a second revised version 22-R2 from the computing device 25 that introduces a second set of three additional features F4, F5, and F6 to the base version 22-B. The custom software package generator 17 determines, for each respective feature in the second set of three additional features, a mapping between the respective feature and a group of qubits in which the respective feature can be stored. The custom software package generator 17 stores the mappings as entries 24-4-24-6 in the features data structure 26. The entry 24-4 corresponds to a first feature F4 in the second set of three additional features and will be stored in the qubits 18-11 and 18-14, the entry 24-5 corresponds to a second feature F5 and will be stored in the qubits 18-12 and 18-15, and the entry 24-6 corresponds to a third feature F6 and will be stored in the qubits 18-13, 18-16, and 18-17.

The environment 10 may include a plurality of computing devices 28-1-28-T (generally, computing devices 28). The computing devices 28 may be in proximity to one another or geographically dispersed. The base version 22-B of the software package may be installed on the computing devices 28 to provide users of the computing devices 28 with a desired functionality.

A user of the computing device 28-1 desires the additional feature F1 of the first revised version 22-R1 but is not interested in the additional features F2 and F3. The user causes the computing device 28-1 to send a request to the QCS 12 for a custom software version of the software package that includes only the base version 22-B and the feature F1 of the first revised version 22-R1. The custom software package generator 17 receives the request. The request identifies the software package 22-B and the feature F1 of the first revised version 22-R1. In one embodiment, the base package 22-B may be continuously maintained in the qubits 18-21-18-Z, the first revised version 22-R1 may be continuously maintained in the qubits 18-1-18-10, and the second revised version 22-R2 may be continuously maintained in the qubits 18-11-18-20. In other implementations, upon the receipt of a request for a custom software version, the custom software package generator 17 may store the base package 22-B in the qubits 18-21-18-Z, the first revised version 22-R1 in the qubits 18-1-18-10, and the second revised version 22-R2 in the qubits 18-11-18-20.

Because the request from the computing device 28-1 identified the feature F1 in the first revised version 22-R1, the custom software package generator 17 puts the qubits 18-1-18-10 into a state of superposition. The custom software package generator 17 accesses the features data structure 26 to determine a first custom set of qubits 18 that comprises a first subset of the first plurality of qubits 18. In this example, the features data structure 26 indicates that the feature F1 is stored in the qubits 18-1 and 18-4, and thus the first custom set of qubits 18 comprises the qubits 18-1 and 18-4. The custom software package generator 17 causes the bias circuits 20-1 and 20-4 to bias the qubits 18-1 and 18-4 in the first custom set of qubits 18. The custom software package generator 17 measures the values of each qubit in superposition to extract the feature F1 from the plurality of qubits 18-1-18-10. The custom software package generator 17 also measures the values of each qubit in the plurality of qubits 18-21-18-Z in which the base version 22-B of the software package is stored. The custom software package generator 17 generates a custom software package 30 based on the values measured in the plurality of qubits 18-1-18-10 and 18-21-18-Z.

The custom software package generator 17 may then send the custom software package 30, or a reference to the custom software package 30, such as a uniform resource identifier (URI), to the computing device 28-1.

As another example, assume that a user of the computing device 28-T desires the additional feature F1 of the first revised version 22-R1 and the additional feature F4 of the second revised version 22-R2, but is not interested in the additional features F2, F3, F5, or F6. The user causes the computing device 28-T to send a request to the QCS 12 for a custom software version of the software package that includes only the features F1 and F4. The custom software package generator 17 receives the request. The request identifies the software package and the features F1 of the first revised version 22-R1 and features F4 of the second revised version 22-R2. In response to the receipt of the request, the custom software package generator 17 stores the base package 22-B in the qubits 18-21-18-Z, the first revised version 22-R1 in the qubits 18-1-18-10, and the second revised version 22-R2 in the qubits 18-11-18-20.

Because the request from the computing device 28-1 identified the feature F1 of the first revised version 22-R1 and the feature F4 of the second revised version 22-R2, the custom software package generator 17 puts the qubits 18-1-18-20 into a state of superposition. The custom software package generator 17 accesses the features data structure 26 to determine a second custom set of qubits 18 that comprises a first subset of the first plurality of qubits 18-1-18-10 in which the first revised version 22-R1 is stored, and a second subset of the second plurality of qubits 18-11-18-20 in which the second revised version 22-R2 is stored. In this example, the features data structure 26 indicates that the feature F1 is stored in the qubits 18-1 and 18-4 and the feature F4 is stored in the qubits 18-11 and 18-14; so the second custom set of qubits 18 comprises the qubits 18-1, 18-4, 18-11, and 18-14. The custom software package generator 17 causes the bias circuits 20-1, 20-4, 20-11, and 20-14 to bias the qubits 18-1, 18-4, 18-11, and 18-14 in the second custom set of qubits 18. The custom software package generator 17 measures the values of each qubit in superposition to extract the features F1 and F4 from the plurality of qubits 18-1-18-20. The custom software package generator 17 also measures the values of each qubit in the plurality of qubits 18-21-18-Z in which the base version 22-B of the software package is stored. The custom software package generator 17 generates a custom software package 32 based on the values measured in the plurality of qubits 18-1-18-Z1.

The custom software package generator 17 may then send the custom software package 32, or a reference to the custom software package 32, to the computing device 28-T.

It is noted that, because the custom software package generator 17 is a component of the QCS 12, functionality implemented by the custom software package generator 17 may be attributed to the QCS 12 generally. Moreover, in examples where the custom software package generator 17 comprises software instructions that program the processor device 14 to carry out functionality discussed herein, functionality implemented by the custom software package generator 17 may be attributed herein to the processor device 14.

Figure 2:
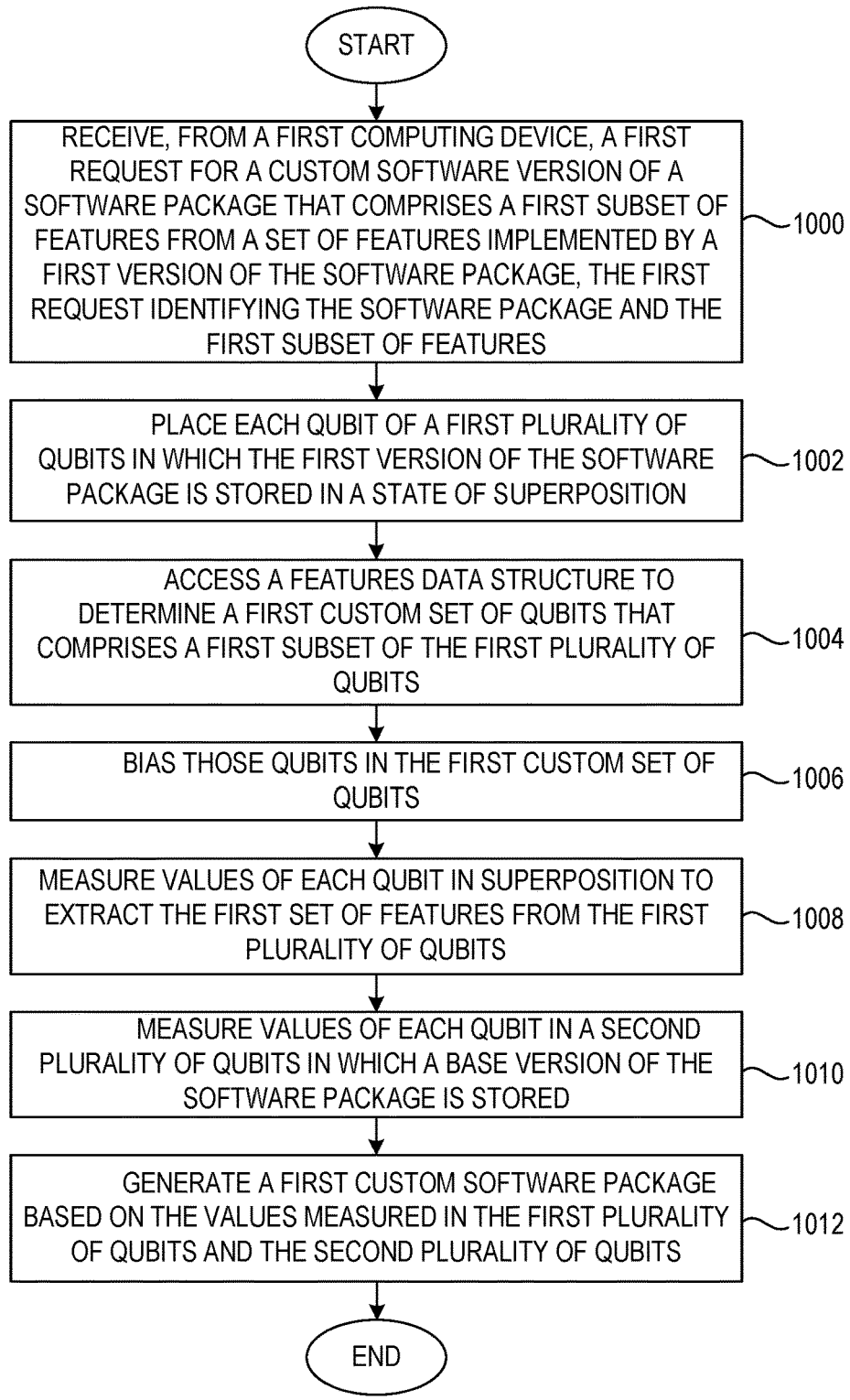

FIG. 2 is a flowchart of a method for deriving a custom software version of a software package from super positioned qubits according to one example. FIG. 2 will be discussed in conjunction with FIG. 1. The QCS 12 receives, from the computing device 28-1, a request for a custom software version of the software package 22-B that comprises the subset of features F1 from the set of features F1, F2, and F3 implemented by the first version 22-R1 of the software package 22-B, the request identifying the software package 22-B and the subset of features F1 (FIG. 2, block 1000). The QCS 12 places each qubit 18 of the plurality of qubits 18-1-18-10 in which the first version 22-R1 of the software package is stored in a state of superposition (FIG. 2, block 1002). The QCS 12 accesses the features data structure 26 to determine the first custom set of qubits 18-1 and 18-4 that comprises the first subset of the first plurality of qubits 18-1-18-10 (FIG. 2, block 1004). The QCS 12 biases those qubits 18 in the first custom set of qubits 18-1 and 18-4 (FIG. 2, block 1006). The QCS 12 measures values of each qubit 18-1-18-10 in superposition to extract the first subset of features F1 from the plurality of qubits 18-1-18-10 (FIG. 2, block 1008).

The QCS 12 measures values of each qubit in a second plurality of qubits in which the base version 22-B of the software package is stored (FIG. 2, block 1010). The QCS 12 generates the first custom software package 30 based on the values measured in the first plurality of qubits 18-1-18-10 and the second plurality of qubits 18-21-18-Z (FIG. 2, block 1012).

Figure 3:
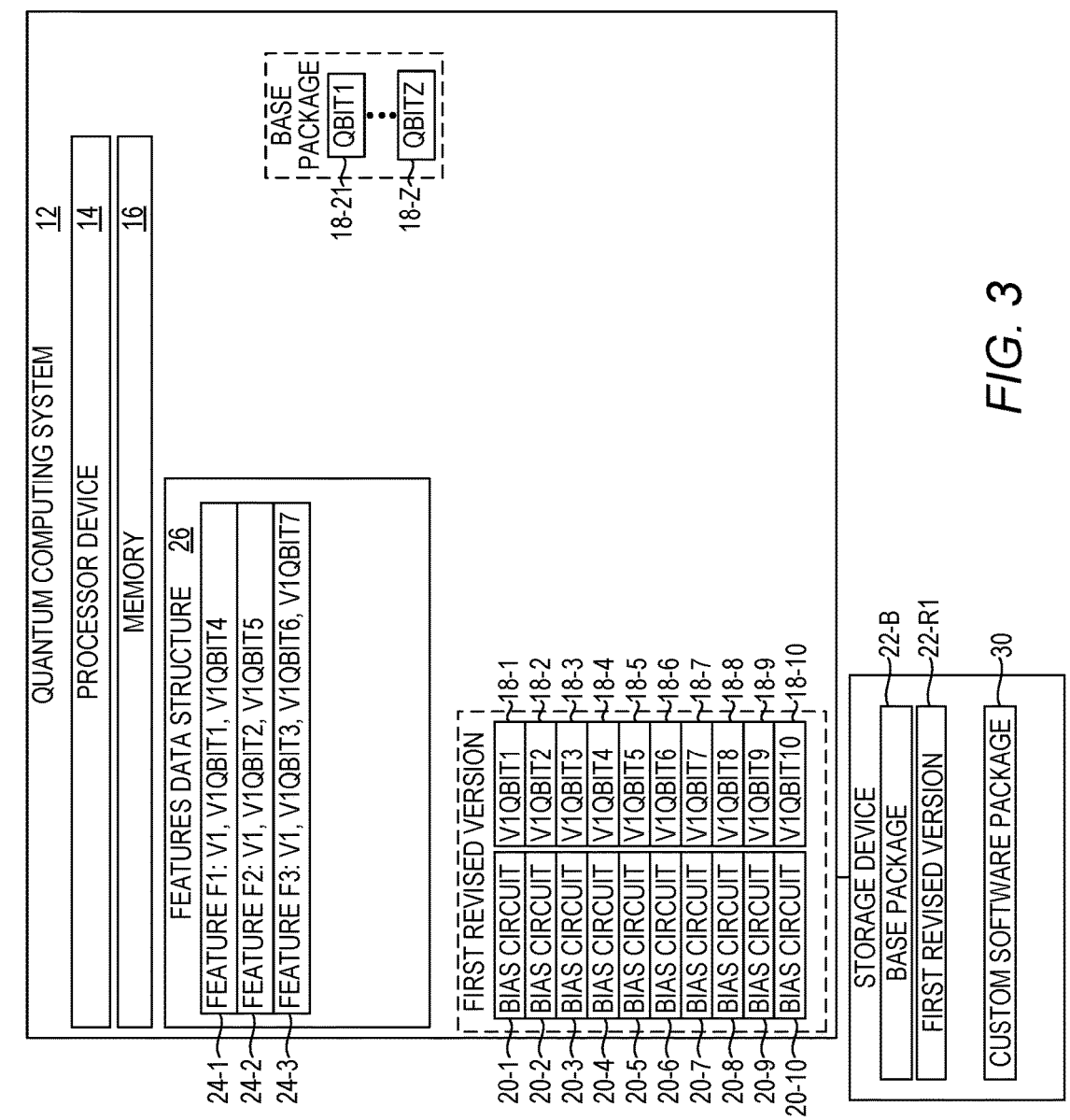

FIG. 3 is a simplified block diagram of the environment 10 illustrated in FIG. 1 according to one embodiment. The environment 10 includes the QCS 12, which in turn includes the memory 16 and the processor device 14 coupled to the memory 16. The processor device 14 is to receive, from the computing device 28-1, a request for a custom software version of the software package 22-B that comprises the subset of features F1 from the set of features F1, F2 and F3 implemented by the first version 22-R1 of the software package 22-B, the request identifying the software package 22-B and the subset of features F1. The processor device 14 is further to place each qubit 18 of the plurality of qubits 18-1-18-10 in which the first version 22-R1 of the software package is stored in a state of superposition. The processor device 14 is further to access the features data structure 26 to determine the first custom set of qubits 18-1 and 18-4 that comprises the first subset of the first plurality of qubits 18-1-18-10. The processor device 14 is further to bias those qubits 18 in the first custom set of qubits 18-1 and 18-4. The processor device 14 is further to measure values of each qubit 18-1-18-10 in superposition to extract the first subset of features F1 from the plurality of qubits 18-1-18-10.

The processor device 14 is further to measure values of each qubit in a second plurality of qubits in which the base version 22-B of the software package is stored. The processor device 14 is further to generate the first custom software package 30 based on the values measured in the first plurality of qubits 18-1-18-10 and the second plurality of qubits 18-21-18-Z.

Figure 4:
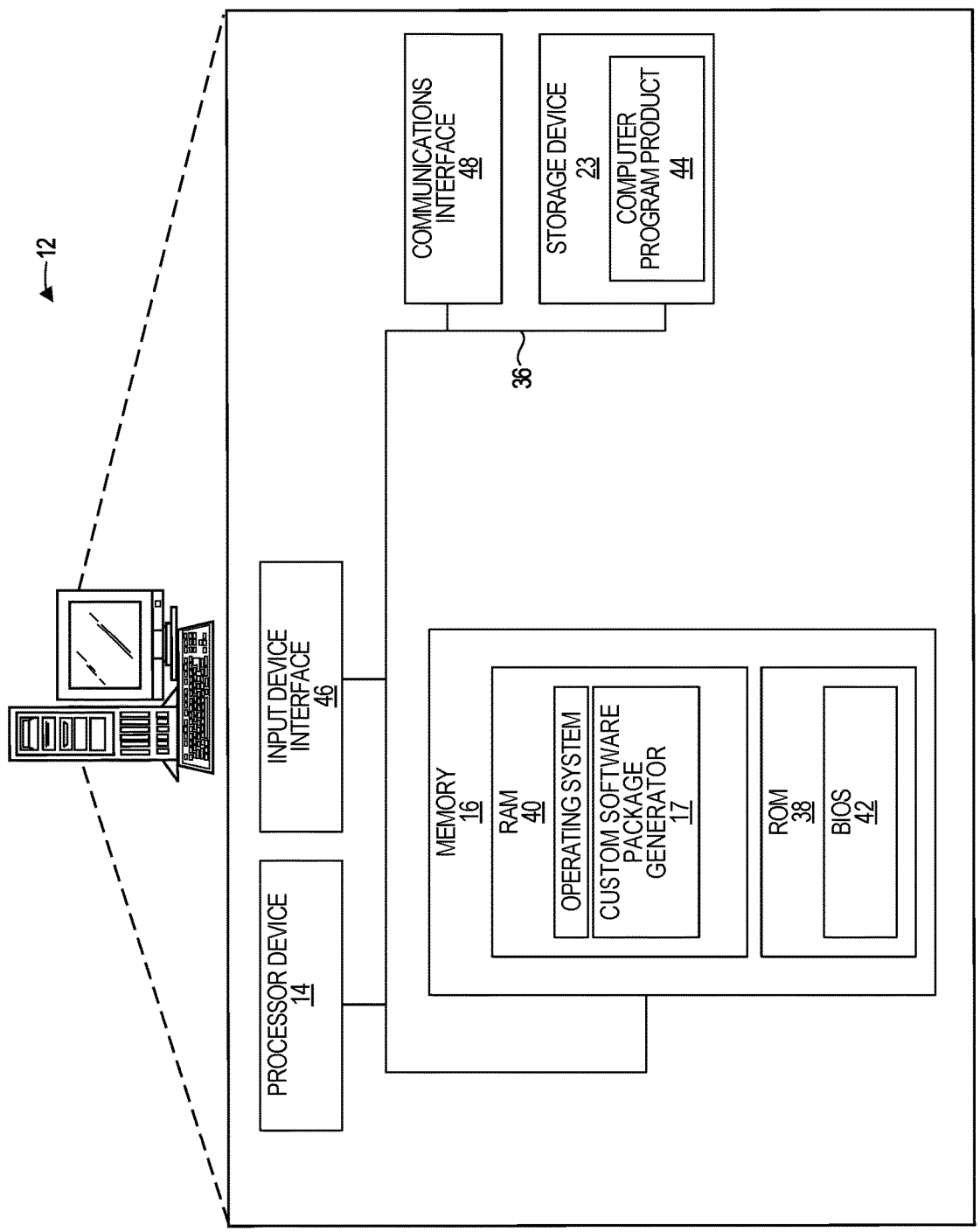

FIG. 4 is a block diagram of the QCS 12 suitable for deriving a custom software package version from super positioned qubits according to one example. The QCS 12 may comprise any quantum computing device or devices capable of including firmware, hardware, and/or executing software instructions to implement the functionality described herein. The QCS 12 includes the processor device 14, the system memory 16, and a system bus 36. The system bus 36 provides an interface for system components including, but not limited to, the system memory 16 and the processor device 14. The processor device 14 can be any commercially available or proprietary processor.

The system bus 36 may be any of several types of bus structures that may further interconnect to a memory bus (with or without a memory controller), a peripheral bus, and/or a local bus using any of a variety of commercially available bus architectures. The system memory 16 may include non-volatile memory 38 (e.g., read-only memory (ROM), erasable programmable read-only memory (EPROM), electrically erasable programmable read-only memory (EEPROM), etc.), and volatile memory 40 (e.g., random-access memory (RAM)). A basic input/output system (BIOS) 42 may be stored in the non-volatile memory 38 and can include the basic routines that help to transfer information between elements within the QCS 12. The volatile memory 40 may also include a high-speed RAM, such as static RAM, for caching data.

The QCS 12 may further include or be coupled to a non-transitory computer-readable storage medium such as the storage device 23, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 23 and other drives associated with computer-readable media and computer-usable media may provide non-volatile storage of data, data structures, computer-executable instructions, and the like.

A number of modules can be stored in the storage device 23 and in the volatile memory 40, including an operating system and one or more program modules, such as the custom software package generator 17, which may implement the functionality described herein in whole or in part. All or a portion of the examples may be implemented as a computer program product 44 stored on a transitory or non-transitory computer-usable or computer-readable storage medium, such as the storage device 23, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the custom software package generator 17 in the volatile memory 40, may serve as a controller, or control system, for the QCS 12 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 14 through an input device interface 46 that is coupled to the system bus 36 but can be connected by other interfaces such as a parallel port, an Institute of Electrical and Electronic Engineers (IEEE) 1394 serial port, a Universal Serial Bus (USB) port, an IR interface, and the like. The QCS 12 may also include a communications interface 48 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a quantum computing system (QCS) from a first computing device, a first request for a custom software version of a software package that comprises a first subset of features from a set of features implemented by a first version of the software package, the first request identifying the software package and the first subset of features;
   placing, by the QCS, each qubit of a first plurality of qubits in which the first version of the software package is stored in a state of superposition;
   accessing, by the QCS, a features data structure to determine a first custom set of qubits that comprises a first subset of the first plurality of qubits;
   biasing, by the QCS, those qubits in the first custom set of qubits;
   measuring, by the QCS, values of each qubit in superposition to extract the first subset of features from the first plurality of qubits;
   measuring, by the QCS, values of each qubit in a second plurality of qubits in which a base version of the software package is stored; and
   generating, by the QCS, a first custom software package based on the values measured in the first plurality of qubits and the second plurality of qubits.

2. The method of claim 1 wherein:
   the first request for the custom software version of the software package comprises the first subset of features from the set of features from the first version of the software package and a second subset of features from a set of features implemented by a second version of the software package, the first request identifying the software package, the first subset of features and the second subset of features;
   wherein placing, by the QCS, each qubit of the first plurality of qubits in which the first version of the software package is stored in the state of superposition further comprises placing, by the QCS, each qubit of a third plurality of qubits in which the second version of the software package is stored in the state of superposition;
   wherein the first custom set of qubits comprises the first subset of the first plurality of qubits and further comprises the second subset of the second plurality of qubits;
   wherein measuring, by the QCS, values of each qubit in superposition to extract the first set of features from the first plurality of qubits further comprises measuring, by the QCS, values of each qubit in superposition to extract the second set of features from the second plurality of qubits; and
   wherein generating, by the QCS, the first custom software package based on the values measured in the first plurality of qubits and the second plurality of qubits further comprises generating, by the QCS, the first custom software package based on the values measured in the first plurality of qubits, the second plurality of qubits, and the third plurality of qubits.

3. The method of claim 1 further comprising sending, by the QCS to the first computing device, the first custom software package or a reference to the first custom software package.

4. The method of claim 1 further comprising, prior to placing each qubit of the first plurality of qubits in which the first version of the software package is stored in the state of superposition, receiving, by the QCS, the first version of the software package.

5. The method of claim 1 further comprising:
   determining, by the QCS, the first set of features; and
   determining, by the QCS for each respective feature in the first set of features, a mapping between the respective feature and a group of qubits in which the respective feature is stored.

6. The method of claim 5 further comprising storing, by the QCS in the features data structure, the mapping.

7. The method of claim 1 further comprising, prior to placing each qubit of the first plurality of qubits in which the first version of the software package is stored in the state of superposition, storing, by the QCS, the first version of the software package in the first plurality of qubits.

8. The method of claim 1 further comprising, prior to placing each qubit of the first plurality of qubits in which the first version of the software package is stored in the state of superposition, receiving, by the QCS, the base version of the software package.

9. The method of claim 1 further comprising storing, by the QCS, the first version of the software package in the first plurality of qubits prior to receiving the first request.

10. The method of claim 1 further comprising storing, by the QCS, the first version of the software package in the first plurality of qubits in response to receiving the first request.

11. The method of claim 1 further comprising:
    receiving, by the QCS from a second computing device, a second request for a second custom software version of the software package that comprises the first subset of features from the set of features implemented by the first version of the software package and a second subset of features from a set of features implemented by a second version of the software package, the second request identifying the software package, the first set of features, and the second set of features;
    placing, by the QCS, each qubit of the first plurality of qubits in which the first version of the software package is stored in the state of superposition;
    placing, by the QCS, each qubit of a third plurality of qubits in which the second version of the software package is stored in the state of superposition;
    accessing, by the QCS, the features data structure to determine a second custom set of qubits that comprises the first subset of the first plurality of qubits and that comprises a second subset of the third plurality of qubits;
    biasing, by the QCS, those qubits in the second custom set of qubits;
    measuring, by the QCS, the values of each qubit in superposition to extract the first subset of features from the first plurality of qubits and the second subset of features from the third plurality of qubits;
    measuring, by the QCS, the values of each qubit in the second plurality of qubits in which the base version of the software package is stored; and generating, by the QCS, a second custom software package based on the values measured in the first plurality of qubits, the second plurality of qubits, and the third plurality of qubits.

12. A quantum computing system, comprising:
a memory; and
a processor device coupled to the memory to:
   receive, from a first computing device, a first request for a custom software version of a software package that comprises a first subset of features from a set of features implemented by a first version of the software package, the first request identifying the software package and the first subset of features;
   place each qubit of a first plurality of qubits in which the first version of the software package is stored in a state of superposition;
   access a features data structure to determine a first custom set of qubits that comprises a first subset of the first plurality of qubits;
   bias those qubits in the first custom set of qubits;
   measure values of each qubit in superposition to extract the first subset of features from the first plurality of qubits;
   measure values of each qubit in a second plurality of qubits in which a base version of the software package is stored; and
   generate a first custom software package based on the values measured in the first plurality of qubits and the second plurality of qubits.

13. The quantum computing system of claim 12 wherein:
the first request for the custom software version of the software package comprises the first subset of features from the set of features from the first version of the software package and a second subset of features from a set of features implemented by a second version of the software package, the first request identifying the software package, the first subset of features and the second subset of features;
to place each qubit of the first plurality of qubits in which the first version of the software package is stored in the state of superposition, the processor device is further to place each qubit of a third plurality of qubits in which the second version of the software package is stored in the state of superposition;
the first custom set of qubits comprises the first subset of the first plurality of qubits and further comprises the second subset of the second plurality of qubits;
to measure values of each qubit in superposition to extract the first set of features from the first plurality of qubits, the processor device is further to measure values of each qubit in superposition to extract the second set of features from the second plurality of qubits; and
to generate the first custom software package based on the values measured in the first plurality of qubits and the second plurality of qubits, the processor device is further to generate the first custom software package based on the values measured in the first plurality of qubits, the second plurality of qubits, and the third plurality of qubits.

14. The quantum computing system of claim 12 wherein the processor device is further to:
determine the first set of features; and
determine, for each respective feature in the first set of features, a mapping between the respective feature and a group of qubits in which the respective feature is stored.

15. The quantum computing system of claim 14 wherein the processor device is further to store, in the features data structure, the mapping.

16. The quantum computing system of claim 12 wherein the processor device is further to, prior to placing each qubit of the first plurality of qubits in which the first version of the software package is stored in the state of superposition, store the first version of the software package in the first plurality of qubits.

17. A non-transitory computer-readable storage medium that includes executable instructions to cause a processor device to:
   receive, from a first computing device, a first request for a custom software version of a software package that comprises a first subset of features from a set of features implemented by a first version of the software package, the first request identifying the software package and the first subset of features;
   place each qubit of a first plurality of qubits in which the first version of the software package is stored in a state of superposition;
   access a features data structure to determine a first custom set of qubits that comprises a first subset of the first plurality of qubits;
   bias those qubits in the first custom set of qubits;
   measure values of each qubit in superposition to extract the first subset of features from the first plurality of qubits;
   measure values of each qubit in a second plurality of qubits in which a base version of the software package is stored; and
   generate a first custom software package based on the values measured in the first plurality of qubits and the second plurality of qubits.

18. The non-transitory computer-readable storage medium of claim 17 wherein:
the first request for the custom software version of the software package comprises the first subset of features from the set of features from the first version of the software package and a second subset of features from a set of features implemented by a second version of the software package, the first request identifying the software package, the first subset of features and the second subset of features;
to place each qubit of the first plurality of qubits in which the first version of the software package is stored in the state of superposition, the instructions further cause the processor device to place each qubit of a third plurality of qubits in which the second version of the software package is stored in the state of superposition;
the first custom set of qubits comprises the first subset of the first plurality of qubits and further comprises the second subset of the second plurality of qubits;
to measure values of each qubit in superposition to extract the first set of features from the first plurality of qubits, the instructions further cause the processor device to measure values of each qubit in superposition to extract the second set of features from the second plurality of qubits; and
to generate the first custom software package based on the values measured in the first plurality of qubits and the second plurality of qubits, the instructions further cause the processor device to generate the first custom software package based on the values measured in the first plurality of qubits, the second plurality of qubits, and the third plurality of qubits.

19. The non-transitory computer-readable storage medium of claim 18 wherein the instructions further cause the processor device to:
  determine the first set of features; and
  determine, for each respective feature in the first set of features, a mapping between the respective feature and a group of qubits in which the respective feature is stored.

20. The non-transitory computer-readable storage medium of claim 19 wherein the instructions further cause the processor device to store, in the features data structure, the mapping.

* * * * *